United States Patent
Wang et al.

(10) Patent No.: US 7,685,784 B2
(45) Date of Patent: Mar. 30, 2010

(54) COOL ROOF COVERING AND ADHESIVE THEREFOR

(75) Inventors: Ge Wang, Solon, OH (US); Richard Lee, North Canton, OH (US); Gregory Rudolph, Chagrin Falls, OH (US)

(73) Assignee: Tremco Incorporated, Beachwood, OH (US)

( * ) Notice: Subject to any disclaimer, the term of this patent is extended or adjusted under 35 U.S.C. 154(b) by 27 days.

(21) Appl. No.: 11/510,385

(22) Filed: Aug. 25, 2006

(65) Prior Publication Data

US 2008/0060301 A1 Mar. 13, 2008

(51) Int. Cl.
*E04B 5/00* (2006.01)
*E04B 1/00* (2006.01)
*E01C 7/26* (2006.01)
*C08L 53/00* (2006.01)

(52) U.S. Cl. .................... 52/408; 52/409; 52/746.1; 52/746.11; 524/68; 525/95

(58) Field of Classification Search .............. 52/408, 52/409, 746.1, 746.11; 524/68; 525/95
See application file for complete search history.

(56) References Cited

U.S. PATENT DOCUMENTS

| | | | | |
|---|---|---|---|---|
| 3,723,170 | A * | 3/1973 | Korpman | 428/355 BL |
| 4,000,140 | A * | 12/1976 | Tierney | 524/69 |
| 5,573,782 | A * | 11/1996 | Bigham et al. | 428/489 |
| 5,599,586 | A * | 2/1997 | Israel | 427/299 |
| 5,670,577 | A | 9/1997 | Dawson, Jr. | |
| 5,807,911 | A * | 9/1998 | Drieskens et al. | 524/68 |
| 6,291,571 | B1 | 9/2001 | Fisher | |
| 6,495,074 | B1 * | 12/2002 | Carr | 264/36.18 |
| 6,696,125 | B2 * | 2/2004 | Zanchetta et al. | 428/40.1 |
| 6,742,313 | B2 * | 6/2004 | Ritland et al. | 52/408 |
| 6,753,362 | B2 * | 6/2004 | Khan et al. | 524/62 |
| 2004/0172908 | A1 | 9/2004 | Swann | |
| 2005/0043468 | A1 | 2/2005 | Fisher | |
| 2007/0087166 | A1 | 4/2007 | Lee et al. | |
| 2007/0130863 | A1 * | 6/2007 | Jones, IV | 52/408 |
| 2008/0277056 | A1 * | 11/2008 | Kalkanoglu et al. | 156/280 |

FOREIGN PATENT DOCUMENTS

| | | |
|---|---|---|
| EP | 0617104 | 9/1994 |
| EP | 0617105 | 9/1994 |
| GB | 1111645 | 5/1968 |
| GB | 1193628 | 6/1970 |
| GB | 2192892 | 1/1988 |

OTHER PUBLICATIONS

Product Brochure, "Powerply White On White Adhesive", 2 pgs., Tremco Incorporated, date unknown.
Kraton Polymers Fact Sheet K0151 Americas, "Providing Improved Performance for Adhesives, Sealants and Coatings", 11 pgs., Jan. 2001.
Kraton Polymers, Kraton D-1102 Polymer Data Document, 2 pgs., issued Aug. 2002.
WO 91/09083, Jun. 27, 1991, Uniroyal Adhesives & Sealant, "Adhesive for Bonding Cured EPDM Membrane to Roof Deck Substrates".
WO 03/066696, Aug. 14, 2003, Kraton Polymers Research B.V., "Novel Block Copolymers and Method for Making Same".

* cited by examiner

*Primary Examiner*—Richard E Chilcot, Jr.
*Assistant Examiner*—Mark R Wendell
(74) *Attorney, Agent, or Firm*—Calfee, Halter & Griswold, LLP

(57) ABSTRACT

A cool roof covering for forming the outermost layer of a bituminous roof coating is provided, this cool roof covering comprising multiple heat-reflecting cap-sheets arranged in an adjacent, overlapping edge fashion and a heat-reflecting cap-sheet adhesive applied to overlapping portions of the cap-sheets for securing these cap-sheets to one another. The heat-reflecting cap-sheets exhibit a solar reflectance of at least 60% and a thermal emittance of at least 65. The heat-reflecting cap-sheet adhesive comprises a storage-stable, VOC-compliant mixture containing at least 10 wt. % of one or more weather-resistant organic resins dissolved in an organic solvent, the adhesive having a viscosity of 15,000 cps or less at 77° F. (25° C.) and exhibiting a lap shear strength of at least about 17 lbf/in when applied to a substrate and dried.

21 Claims, No Drawings

COOL ROOF COVERING AND ADHESIVE THEREFOR

BACKGROUND

Three different approaches are commonly used to form the outermost surface layer of a bituminous membrane roofing system, i.e. a roofing system composed of one or more layers of a water-proof membrane commonly made from a bituminous material or analog.

In the first, referred to here as the "in-situ aggregate" approach, a layer of bitumen (asphalt) or other adhesive is laid down on the underlayment of the roofing system, i.e. the portion of the roofing system under the outermost layer, and a layer of aggregate typically on the order of about ⅜ inch (~1 cm) in diameter is laid down on and partially embedded in the adhesive.

In the second, referred to here as the "liquid applied membrane" approach, the outermost surface layer is formed by coating the underlayment with a roof paint or covering which forms a relatively thick (i.e. membrane-like) waterproof coating.

In the third, referred to here as the "cap-sheet" approach, the outermost surface layer is formed from multiple pre-formed membranes or sheets (hereinafter "cap-sheets") which are laid up or arranged in an adjacent, overlapping edge fashion (like shingles in a shingle roof) to cover the entire roof surface to be covered. A layer of bitumen (asphalt) or other adhesive, typically applied to one or more lateral edges of each cap-sheet, is used to secure these cap-sheets to one another as well as the underlayment. Typically, these cap-sheets are made from a fibrous web or sheet of fiberglass, polyester fiber or both impregnated with bitumen (asphalt) or other suitable adhesive. Not infrequently, these cap-sheets are also covered with a suitable aggregate during manufacture for adding desired texture and/or color. Because the edges of adjacent cap-sheets are normally adhered atop one another, such aggregate is normally much smaller in size, typically on the order of ⅛ inch (~0.3 cm) in diameter or less.

Commonly assigned application Ser. No. 11/250,075, filed Oct. 13, 2005, the disclosure of which is incorporated herein by reference, describes a "cool roof" covering, i.e. a roofing system having high solar reflectance and high heat emittance, in which the outermost surface layer of the bituminous membrane roofing system is formed using the in-situ aggregate approach. For this purpose, light-colored aggregates are preferably used since light-colored materials absorb less infrared radiation than darker materials and hence have better solar reflectance and thermal emittance properties. Depending on the particular aggregate and adhesive used, the cool roof covering disclosed there can have a solar reflectance of as much as 90% and a thermal emittance of as much as 95%.

SUMMARY OF THE INVENTION

In accordance this invention, a cool roof covering made using the cap-sheet approach is provided for forming the outermost surface layer of the bituminous membrane roofing system, this cool roof covering comprising multiple overlapping heat-reflecting cap-sheets and a heat-reflecting cap-sheet adhesive applied to overlapping portions of the cap-sheets for securing these cap-sheets to one another. The heat-reflecting cap-sheets exhibit a solar reflectance of at least 60% and a thermal emittance of at least 65, while the heat-reflecting cap-sheet adhesive comprises a storage-stable, VOC-compliant mixture containing at least 10 wt. % of one or more weather-resistant organic resins dissolved in an organic solvent, the adhesive having a viscosity of 50,000 cps or less at 77° F. (25° C.) and exhibiting a lap shear strength of at least about 17 lbf/in when applied to a substrate and dried.

DETAILED DESCRIPTION

The new cool roof covering of this invention comprises multiple overlapping heat-reflecting cap-sheets and a heat-reflecting cap-sheet adhesive applied to overlapping portions of the cap-sheets for securing these cap-sheets to one another.

Underlayment and Roof Substrate

Bituminous roofing systems are commonly used for covering horizontal and low-slope roof substrates, i.e., substantially horizontal roof substrates sloped enough to allow positive drainage. The roof substrate can be made from any type of material such as wood (e.g. woodfiber board, plywood), concrete, metal or plastic, Normally, it is cleaned of dirt and other impurities and/or pretreated by well-known activation techniques for enhancing its surface adhesion properties before the bituminous roofing system is applied.

When a new bituminous roofing system is being applied to a roof substrate, the underlayment of the bituminous roofing system is formed normally by applying a liquid bituminous composition, e.g. molten bitumen or a solvent based bitumen adhesive, and then applying a pre-formed bituminous membrane over the bituminous composition. This can be done a single time so as to form a "single-ply" underlayment or multiple times to form a "multi-ply" or "built-up" or "BUR" underlayment. The pre-formed bituminous membranes used for this purpose are usually composed of a carrier such as paper, fiberglass, polyester or felt which is impregnated with bitumen or other similar material.

Once the underlayment is formed, the outermost layer of the bituminous roofing system is then applied to complete the bituminous roofing system. In accordance with this invention, this outermost layer is formed from the new cool roof covering described here.

The Cap-Sheet

One component of the inventive cool roof covering is a cap-sheet exhibiting a high solar reflectance and a high thermal emittance, hereinafter a "heat reflecting cap-sheet." Normally, the heat reflecting cap-sheet will exhibit a solar reflectance of at least 60%, as measured by ASTM E1918-97 and ASTM E903-96, and a thermal emittance of at least 65, as measured by ASTM E-408-71. More typically, it will exhibit a solar reflectance of 70-90%, and a thermal emittance of about 75-95.

The heat reflecting cap-sheet of this invention can be made in the same way as cap-sheets used for conventional shingle-type roofing systems such as, for example, by impregnating a fibrous bat or web made from fiberglass, polyester fiber or both with bitumen (asphalt) or the like. Preferably, the cap-sheet is made to conform with Title 24 of the California Building Energy Efficiency Standards, Residential and Non-Residential Buildings, P400-03-001F, Oct. 1, 2005, Section 118.

In accordance with this invention however, the materials selected to make the outer surface of the cap-sheet (i.e., the surface that will be visible when the shingle is in an installed condition) should be made from materials which exhibit a desirably high solar reflectance and high thermal emittance. So, for example, the outer surface of the cap-sheet can be provided with a layer of aggregate which exhibits these desired properties such as, for example, mica, marble chips, granite, limestone, etc. Other aggregates which are lighter in color can also be used, since lighter-colored materials normally absorb less solar radiation than darker aggregates. Although such aggregates can be bonded to the body of the cap-sheet with bitumen (asphalt), it is desirable that adhesives lighter in color be used for this purpose, since greater solar reflectance and thermal emittance are normally achieved by this approach.

Another approach for making the heat reflecting cap-sheets of this invention is to cover the outside surface of a conventional cap-sheet with a white or light colored weather proof coating. This can be done, for example, with commercially available roof paint or covering such as the acrylic-based liquid applied membrane available from Tremco, Inc. of Beachwood, Ohio, under the name of "Hybuild Reflective Coating." When following this approach, the conventional cap-sheet being coated can optionally include pre-applied aggregates, if desired. Since the white or light colored weather proof coating is applied over these aggregates, aggregates of any color, solar reflectance and thermal emittance can be used since they will be covered by the coating and hence hidden from direct application of the sun. Thus, gravel, limestone, granite, slag, volcanic rock, crushed brick, dolomite, tabular alumina, ceramic and marble can also be used as the aggregate, for example. Aggregates overcoated with a white or light colored weather proof coating can be bonded to the body of the cap-sheet with bitumen (asphalt) or any other desired adhesive, since it too will be hidden from direct application of the sun.

The Adhesive

The adhesive used in making the inventive shingle-type cool roof covering (hereinafter "heat reflecting cap-sheet adhesive") comprises a VOC-compliant mixture containing one or more organic resins and an organic solvent system capable of dissolving the organic resin. Particularly interesting adhesives are also storage stable, fire retardant or both. They are also preferably white or at least light-colored, so as not to absorb significant solar radiation. In addition, they are also preferably non-tacky to reduce dirt pick-up.

In this context, "storage stable" means that the adhesive composition can be stored in containers for at least six months without substantial separation of its ingredients whereby only minor mixing is necessary to provide a homogenous composition. For this purpose, minor mixing can be provided with a Hennes-Johnson series 600 barrel mixer as well as other similar commonly available mixing equipment. In addition, "fire retardant" means that the adhesive composition in its final form, i.e. after being applied and dried, will not support combustion. Similarly, "VOC-compliant" means that the adhesive composition contains no more than 250 grams of non-exempt volatile organic compounds per liter of composition. Adhesive compositions containing no more than 225 gms/l VOC's, or no more than 200 gms/l VOC's and even no more than 175 gms/l VOC's, are particularly interesting. Meanwhile, "heat-reflecting" means that the adhesive, when applied to a test substrate and dried to form a solid layer at least about 0.016 inch (0.4 mm) thick will exhibit a solar reflectance of at least 50%. Heat reflecting cap-sheet adhesives exhibiting a solar reflectance of 60% or more, and even 75% or more, are particularly interesting.

It will also be appreciated that "adhesive" is used in this disclosure in accordance with the normal meaning of this word. Solvent-based adhesives work through evaporation of the organic solvent from the composition. Nonetheless, "adhesive" is commonly used to refer to adhesive compositions both before they are applied to substrates as well as after they have been applied and an adhesive bond formed through evaporation of the solvent. That same conventional usage is followed in this disclosure as well.

An important feature of the inventive heat reflecting cap-sheet adhesive is that it can be applied to the roof substrate at ambient conditions by squeegee or other similar mechanical device, e.g., broom, mop or the like. For this purpose, the viscosity of the adhesive should not be too great, since otherwise it cannot be mechanically manipulated and moved into place with these devices as a practical matter. Therefore, it is desirable that the viscosities of the inventive heat reflecting cap-sheet adhesive be about 50,000 cps or less at 77° F. (25° C.), preferably about 25,000 cps or less or even about 10,000 cps or less. Heat reflecting cap-sheet adhesives with viscosities on the order of 6,000-10,000 cps are particularly interesting.

There is no real lower limit on the viscosity of the inventive heat reflecting cap-sheet adhesive, as a practical matter. This is because there is a tradeoff between viscosity on the one hand and concentration of dissolved organic resin on the other hand. As further discussed below, the inventive heat reflecting cap-sheet adhesive preferably contains as much organic resin as possible in order to maximize performance properties. Unfortunately, higher concentrations of dissolved organic resin lead to higher viscosities, and so it is difficult to obtain an adhesive containing a high concentration of dissolved organic resin while still exhibiting a viscosity of 6,000 cps or less.

Preferred heat reflecting cap-sheet adhesives in accordance with this invention are also sprayable. "Sprayable" in this context means that the adhesive can be applied to a roof substrate by means of commercially-available spraying equipment, for example, a double ball displacement pump with a pressure range of 500 to 700 psi such as Hennis-Johnson HJ4518X, HJ5318, or a Garlock 120 Sprayer. As appreciated by those skilled in the art, sprayable mixtures have viscosities and other properties which allow them to be atomized into droplets by the shear forces created when the composition is forced through a nozzle at high pressure while simultaneously allowing the droplets so-created to recombine into a coherent mass in layer form when deposited on a substrate.

As indicated above, the heat reflecting cap-sheet adhesive of this invention comprises one or more organic resins dissolved in a suitable organic solvent system therefor. Essentially any organic solvent can be used for this purpose, provided that it can dissolve the organic resin or resins used in sufficient concentration. In this regard, practical considerations dictate that the inventive heat reflecting cap-sheet adhesive be as concentrated in organic resin as possible, since this reduces costs relating to its manufacture, packaging, storage and distribution. Therefore, the concentration of the organic resin or resins in the adhesive is desirably at least about 10 wt. %, more desirably about 15 wt. % or more or even 20 wt. % or more.

Moreover as further indicated above, the heat reflecting cap-sheet adhesive of this invention should be VOC compliant for environmental reasons. As a practical matter, this limits the concentration of non-exempt volatile organic compounds to no more than 250 grams per liter of adhesive composition. Therefore, the solvent or solvent mixture which is used in the inventive heat reflecting cap-sheet adhesive of this invention should not only achieve a VOC compliant adhesive product but also be capable of dissolving the organic resin or resins used in this adhesive in sufficient amount.

Examples of suitable non-exempt volatile organic compounds that can be used for making the heat reflecting cap-sheet adhesives of this invention include Solvent 100, mineral spirits, other petroleum fractions such as naphtha and the like, natural and synthetic spirits, etc. Solvent 100 or "S-100," which is a well-known, a high aromatic, petroleum fraction commonly used as an industrial solvent, is especially interesting.

Examples of suitable exempt solvents that can be combined with the above non-exempt volatile organic compounds for making the heat reflecting cap-sheet adhesives of this invention include Oxol 100 as well as any other solvent listed in Group I of the SCAQMD (Rule 102 of the South Coast Air Quality Management Department. Oxol 100, which refers to compositions containing p-chlorobenzenetrifluroride available from a number of sources including MANA of New York, N.Y., is particularly interesting. As well appreciated in the art, routine experimentation may be necessary to determine which exempt volatile organic compound and which non-exempt solvent are most appropriate for particular organic resins or resin combinations used to make the heat reflecting cap-sheet adhesives of this invention.

The organic resins (or resin combinations) that are used to make the heat reflecting cap-sheet adhesives of this invention should be both flexible and weather-resistant. In this context, "weather-resistant" means that the resin or resin combination in its final form, i.e. after being formulated into an adhesive and applied to a substrate and dried, will not significantly degrade when exposed to ambient outdoor conditions including sunlight, rain, snow and the like over extended periods of time. Meanwhile, "flexible" in this context means that the resin in its final form will also exhibit a lap shear strength of at least about 17 lbf/in, when measured by ASTM D-3019. More interesting heat reflecting cap-sheet adhesives of this invention exhibit lap shear strengths of about 50 lbf/in or more, or even about 90 lbf/in or more.

In this connection, it should be appreciated that the adjacent, overlapping cap-sheets which are secured together with the heat reflecting cap-sheet adhesives of this invention may have substantial lengths. The adhesive seam bonding these adjacent, overlapping cap-sheets to one another is therefore likely to encounter significant mechanical stress due to thermal expansion and contraction of these cap-sheets. Mechanical stress can also be caused by walking on the completed roofing system. To accommodate these stresses, the inventive heat reflecting cap-sheet adhesive should exhibit a combination of good adhesion (i.e., good bond strength to adjacent cap-sheets), good cohesion (i.e., good internal bond strength) and good elongation (ability to flex without rupture). Thus it is desirable that the heat reflecting cap-sheet adhesive of this invention exhibit the lap shear strengths indicated above.

Particular examples of organic resins which can be used to make the heat reflecting cap-sheet adhesives of this invention include polybutylene, and copolymers of ethylene, propylene and butylene; vinyl-based resins, e.g., polymers and copolymers of various vinyl monomers including vinyl chloride, vinylidene chloride, styrene, acrylonitrile, acrylic and methacrylic esters of all types and especially esters of $C_1$-$C_8$ alkyls; olefin-modified vinyl resins, e.g. the above vinyl polymers and copolymers further containing olefins such as ethylene, propylene, butylenes, etc.; rubber modified vinyl and olefin polymers, e.g., the foregoing polymers and copolymers further containing butadiene, isoprene or other diolefin; and the like. Mixtures of different organic resins can also be used.

Particular examples of useful organic resins include poly (methyl methacrylate) and poly(ethyl methacrylate), polystyrenes such as poly(p-styrene) and syndiotactic polystyrene, and styrene-based copolymers especially including styrene, butadiene block copolymers such as SBS, SBR and SEBS, vinylic polymers such as polyvinyl chloride, polyvinylicene chloride, polyvinylidene fluoride and polyvinylidone dichloride, copolymers of ethylene, propylene and/or butylene, copolymers containing ethylene such as ethylene vinyl acetate, ethylene acrylic acid and ethylene methacrylate copolymer, and mixtures thereof.

A more interesting class of organic resins are the styrene-modified acrylic resins, i.e. copolymers of styrene or analog (substituted styrenes substituted with one or two substituents selected from $C_1$-$C_8$ alkyls and at least one $C_1$-$C_8$ alkyl ester of acrylic acid, methacrylic acid or both. Such copolymers may contain up to 50 mol %, more typically up to 20 mol %, of one or more additional copolymerizable monomers such as the mentioned above. These copolymers are especially interesting because they form strong, coherent, weather-resistant coatings when applied in organic solution by spay coating techniques. Moreover, they readily dissolve in inexpensive organic solvents such as mineral spirits to form storage stable adhesive compositions, even though these compositions may contain large volumes of light weight fillers.

An even more interesting class of organic resins are thermoplastic elastomers in the form of block copolymers of "hard" blocks or segments interspersed with "soft" or "rubbery" blocks or segments. Because the different blocks or "domains" in these copolymers exhibit distinctly different properties, these copolymers as a whole exhibit two distinct glass transition temperatures ($T_g$). The "two-phase" structure of these block copolymers provides tough elastomeric rubbery properties at end-use temperatures wheel being able to be easily dissolved in solvent to form low viscosity solutions.

Particularly interesting block copolymers of this type exhibit higher $T_g$'s of 50° C. or more, more desirably 75° C. or more or even 90° C. or more, while simultaneously exhibiting lower $T_g$'s of −20° C. or less, more desirably −35° C. or less or even −50° C. or less. Block copolymers exhibiting higher $T_g$'s of 75° C. or more and lower $T_g$'s of −35° C. or less are even more interesting, while block copolymers exhibiting higher $T_g$'s of 90° C. or more and lower $T_g$'s of −50° C. or less are especially even more interesting.

Examples of such block copolymers are those in which the hard blocks are formed from polymerized styrene, while the soft or elastomeric blocks are formed from polymerized ethylene, propylene, butylene, other C5-C12 monounsaturated alkenes, polyunsaturated alkenes such as isoprene and 1,4-butadiene, or combinations thereof. Block copolymers in which the hard blocks are formed from styrene and the soft blocks are formed from polymerized ethylene, propylene, butylene, isoprene, 1,4-butadiene and mixtures thereof are especially interesting.

Such block copolymers when composed of a single elastomeric block in the center with a single hard block on one end ("diblock" copolymers) are especially interesting, as are such block copolymers when composed of a single elastomeric block in the center with a single hard block on both ends ("triblock" copolymers). Examples of such diblock and triblock copolymers are the "Kraton®" line of polystyrene/elastomer block copolymers available from The KRATON Polymers Group of Companies of Houston, Tex.

Generally speaking, there is a trade-off in these polymers between solution viscosity on the one hand and strength and toughness on the other hand. For example, diblock copolymers exhibit more desirable (lower) solution viscosities but less desirable (lower) strength and toughness. In contrast, triblock block copolymers exhibit less desirable (higher) solution viscosities but more desirable (strength) strength and toughness. Therefore, it may be necessary when designing a particular adhesive with a particular solvent system to select the particular block copolymer which provides the most desirable combination of these properties. In addition, it may also be desirable in some instances to use mixtures of these block copolymers, e.g. mixtures of diblock and triblock copolymers. Mixtures of two or more diblock copolymers or two or more triblock copolymers can also be used. Note, also, that some of these products as supplied by the manufacturer such as Kraton G-1726, for example, already contain mixtures of these polymers. In addition, the different molecular weights of these block copolymers can also play a role in designing a particular combination or organic resins achieving the desired trade-off between solvent viscosity, on the one hand, and strength and toughness on the other hand.

Various optional ingredients can also be included in the heat-reflecting cap-sheet adhesives of this invention including pigments, pigment extenders, wetting agents, plasticizers, fire retardants, defoaming agents, fillers including light weight fillers, and other additives.

Pigments can be included in the adhesives of this invention to add reflectance. Although most of the inventive heat reflecting adhesive will be covered by an overlapping cap-sheet when in a final in-use condition, a small portion may inadvertently squeeze out from between overlapping cap-sheets and hence be exposed to view. It therefore may be desirable in at least in some embodiments to include a white or other light-colored pigment in the adhesive so that this inadvertently exposed adhesive reflects as much radiation as possible. Titanium dioxide will most commonly be used for this purpose, as it is widely available and relatively inexpensive.

Any amount of pigment can be included in the heat-reflecting adhesives of this invention. Normally, the amount of pigment will not exceed 15 wt. %, more typically 10 wt. %. Depending on the intensity of the white or light color desired, concentrations on the order of about 0.5 wt. % or more, more typically about 2, 4 or even 5 wt. % or more, may be used. Also, up to about 50 wt. % of the pigment can be replaced with a pigment extender such as anhydrous calcium sulfate and calcium carbonate. Such extenders can reduce pigment costs.

Plasticizers can also be included in the adhesive for reducing viscosity, and hence enhancing sprayability, of the compositions obtained. Plasticizers also maintain polymer flexibility and hence the long term adhesion of the cool roof covering to its substrate. Certain plasticizers such as brominated and/or chlorinated paraffins, for example, also enhance fire retardancy. Any amount of plasticizer can be used, although concentrations exceeding about 15 wt. %, more typically more than about 10 wt. %, based on the weight of the adhesive composition as a whole are normally avoided.

Other conventional additives such as wetting agents, defoaming agents, UV absorbers and fire retardants can be included in conventional amounts, if desired. In this connection, combinations of calcium sulfate dihydrate and brominated and/or chlorinated paraffins, as mentioned above, provide an interesting fire-retardant package in that they can suppress combustion without adversely affecting density, viscosity, pigment loading and film formation of the adhesives in which they are contained.

Forming the New Cool Roof Covering

The inventive cool roof covering is formed in essentially the same way as the conventional cap-sheet coverings described above, i.e., by laying up or arranging multiple heat-reflecting cap-sheets in adjacent, overlapping-edge fashion to cover the entire roof surface to be covered with a layer of the heat-reflecting cap-sheet adhesive of this invention being applied to one or more lateral edges of each cap-sheet for securing these cap-sheets to one another as well as the roof substrate being covered.

EXAMPLES

In order to more thoroughly describe the present invention, the following working examples are presented:

Example 1

Adhesive Composition

An adhesive composition was prepared by adding the ingredients listed in the following Table 1 with sufficient mixing to form a homogenous composition:

TABLE 1

Adhesive Composition No. 1

| Chemical Name/Group or Family | Use | Wt % |
|---|---|---|
| S-100 Aromatic hydrocarbon | Vehicle/solvent | 15.5 |
| Oxol 100 | Exempt solvent | 28 |
| Styrene/Acrylate copolymer | Resin | 6 |
| high mol. wt. Styrene/ethylene-butylene/styrene block copolymer | Resin | 7 |
| low mol. wt. Styrene/ethylene-butylene/styrene block copolymer | Resin | 9.5 |
| Titanium Dioxide | Pigment | 9 |
| Mineral Oil | Plasticizer | 15 |
| Calcium Sulfate | Pigment extender | 5 |
| Interfiber 5 ft | Reinforcing filler | 2 |
| Sil-Cel | Light weight filler | 3 |
| | | 100 |

Example 2

Adhesive Composition

Example 1 was repeated, except the adhesive was prepared from the ingredients listed following Table 2:

| Chemical Name/Group or Family | Use | Wt % |
|---|---|---|
| Mineral Oil | Plasticizer | 12.9% |
| S-100 Aromatic hydrocarbon | Vehicle/solvent | 15.4% |
| Oxol 100 | Exempt solvent | 35.3% |
| Styrene/Acrylate copolymer | Resin | 5.2% |
| high mol. wt. Styrene/ethylene-butylene/styrene block copolymer | Resin | 6.1% |
| low mol. wt. Styrene/ethylene-butylene/styrene block copolymer | Resin | 8.3% |
| Titanium Dioxide | Pigment | 7.8% |
| Calcium Sulfate | Pigment extender | 4.3% |
| Interfibe 5 ft | Reinforcing Fiber | 1.7% |
| Sil-Cel | Light weight filler | 2.6% |
| BYK 052 | Defoamer | 0.5% |
| | | 100.0% |

The composition exhibited a lap shear strength of 90 lbf/in when tested according to ASTM D-3019, thereby indicating that it could withstand substantial applied stresses when used to bond overlapping cap-sheets together in a shingle type cool roof covering. In addition, the composition also exhibited a viscosity of 7,000 cps at 77° F. (25° C.), thereby indicating it was readily sprayable and workable by squeegee, even though it contained over 20 wt. % dissolved resin.

Although only a few embodiments of the new cool roof covering of this disclosure have been provided above, many modifications can be made without departing from the spirit and scope of this disclosure. For example the cool roof coverings of this invention, in addition to being used for building new bituminous roofing systems, can also be used for recovering existing bituminous roofing systems. In this case, the existing bituminous roofing system will function as the "underlayment" on top of which the cool roof covering of this invention is applied in the manner indicated above. All such modifications are intended to be included within the scope of the technology disclosed here, which is to be limited only by the following claims.

The invention claimed is:

1. A heat-reflecting adhesive for use in forming a cool roof covering, the adhesive consisting essentially of a storage-stable, VOC-compliant mixture containing at least 10 wt. % of an organic resin component dissolved in an organic solvent, the organic resin component comprising at least one thermoplastic elastomer in the form of a block copolymer formed from at least one hard block and at least one elastomeric block such the block copolymer as a whole exhibits two distinct glass transition temperatures,
   wherein the adhesive has a viscosity of 15,000 cps or less at 77° F. (25° C.), and
   further wherein the adhesive when applied to a substrate and dried exhibits a lap shear strength of at least about 17 lbf/in and a solar reflectance of at least 50%.

2. The adhesive of claim 1, wherein the adhesive has a viscosity of 12,500 cps or less at 77° F. (25° C.), and exhibits a lap shear strength when dried of at least about 50 lbf/in.

3. The adhesive of claim 2, wherein the adhesive contains at least about 15 wt. % dissolved organic resin.

4. The adhesive of claim 1, wherein the two distinct glass transition temperatures include a higher glass transition temperature of 50° C. or more and a lower glass transition temperature of −20° C. or less.

5. The adhesive of claim 4, wherein the block copolymer exhibits a higher glass transition temperature of 75° C. or more while simultaneously exhibiting a lower glass transition temperature of −35° C. or less.

6. The adhesive of claim 4, wherein the block copolymer is formed from a single elastomeric block in the center of the copolymer molecule with a single hard block on one or both ends.

7. The adhesive of claim 6, wherein the adhesive contains a mixture of a diblock copolymer and a triblock copolymer, or a mixture of two diblock copolymers or a mixture of two triblock copolymers.

8. The adhesive of claim 7, wherein the hard block or blocks is formed from styrene, while the elastomeric block is formed from ethylene, propylene, butylene, other $C_5$-$C_{12}$ monounsaturated alkenes, polyunsaturated alkenes, or combinations thereof.

9. The adhesive of claim 8, wherein the hard block or blocks are formed from styrene while the elastomeric block is formed from ethylene, propylene, butylene, isoprene, 1,4-butadiene or mixtures thereof.

10. The adhesive of claim 8, wherein the adhesive contains a mixture of a diblock copolymer and a triblock copolymer.

11. The adhesive of claim 1, wherein the adhesive is white or light-colored as a result of containing about 0.5 wt. % to about 15 wt. % pigment, and further wherein the pigment is titanium dioxide.

12. The adhesive of claim 1, wherein the adhesive consists of said storage-stable, VOC-compliant mixture.

13. The adhesive of claim 1, wherein the adhesive is essentially asphalt-free.

14. A cool roof covering for covering the underlayment of a bituminous roofing system, the cool roof covering comprising multiple heat-reflecting cap-sheets arranged in an adjacent, overlapping edge fashion and a layer of heat-reflecting cap-sheet adhesive applied to one or more lateral edges of each cap-sheet for securing these cap-sheets to one another as well as the underlayment,
   wherein the heat-reflecting cap-sheets exhibit a solar reflectance of at least 60% and a thermal emittance of at least 65, and further
   wherein the heat-reflecting cap-sheet adhesive consists essentially of a storage-stable, VOC-compliant mixture containing at least 10 wt. % of an organic resin component dissolved in an organic solvent, the organic resin component including at least one thermoplastic elastomer in the form of a block copolymer formed from at least one hard block and at least one elastomeric block such the block copolymer as a whole exhibits two distinct glass transition temperatures,
   wherein the adhesive has a viscosity of 15,000 cps or less at 77° F. (25° C.), the adhesive when applied to a substrate and dried exhibiting a lap shear strength of at least about 17 lbf/in and a solar reflectance of at least 50%.

15. The cool roof covering of claim 14, wherein the adhesive contains at least one thermoplastic elastomer in the form of a block copolymer exhibiting two distinct glass transition temperatures, a high glass transition temperature of 50° C. or more and a low glass transition temperature of −20° C. or less.

16. The cool roof covering of claim 15, wherein the thermoplastic elastomer is formed from at least one hard block or blocks made from styrene and at least one elastomeric block made from ethylene, propylene, butylene, other C5-C12 monounsaturated alkenes, polyunsaturated alkenes, or combinations thereof.

17. The cool roof covering of claim 16, wherein the block copolymer is formed from a single elastomeric block in the center of the copolymer molecule and a single hard block on one or both ends of the elastomeric block.

18. The cool roof covering of claim 17, wherein the hard block or blocks are formed from styrene while the elastomeric block is formed from ethylene, propylene, butylene, isoprene, 1,4-butadiene or mixtures thereof.

19. The cool roof covering of claim 14, wherein the adhesive is white or light-colored as a result of containing about 0.5 wt. % to about 15 wt. % pigment, and further wherein the pigment is titanium dioxide.

20. The cool roof covering of claim 14, wherein the adhesive consists of said storage-stable, VOC-compliant mixture.

21. The cool roof covering of claim 14, wherein the adhesive is essentially asphalt-free.

* * * * *